Aug. 14, 1928.　　　　　　　　　　　　　　1,681,118
O. JASCHKE
PROCESS OF EXTRACTING, SEPARATING, AND UTILIZING THE STARCH AND
PROTEIN CONTENTS OF RICE
Filed April 4, 1925　　　2 Sheets-Sheet 2
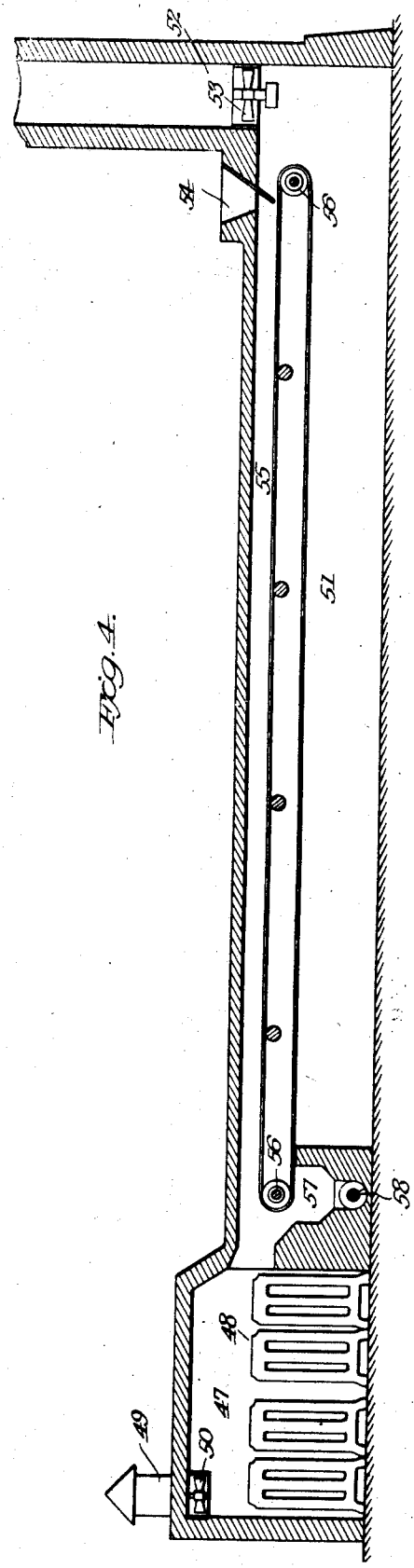
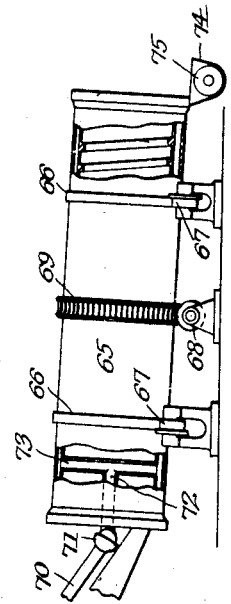
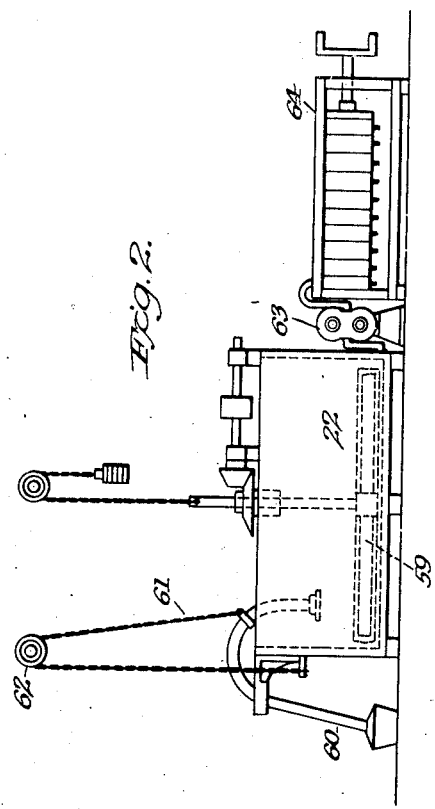
Inventor:
Otto Jaschke,
By Dodget Sons,
Attorneys.

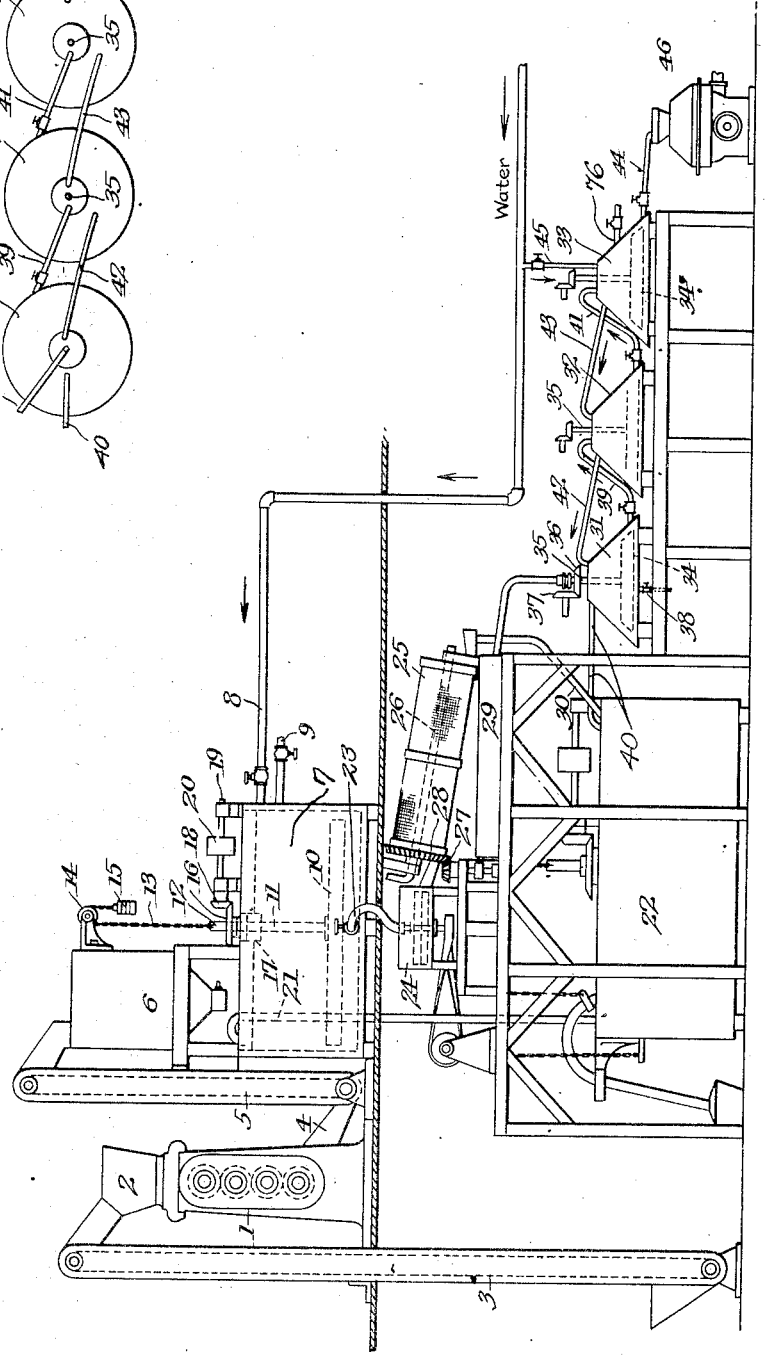
Aug. 14, 1928.
O. JASCHKE
1,681,118
PROCESS OF EXTRACTING, SEPARATING, AND UTILIZING THE STARCH AND PROTEIN CONTENTS OF RICE
Filed April 4, 1925   2 Sheets-Sheet 1
Inventor:
Otto Jaschke,
By Dodge & Sons,
Attorneys.

Patented Aug. 14, 1928.

1,681,118

UNITED STATES PATENT OFFICE.

OTTO JASCHKE, OF CROWLEY, LOUISIANA.

PROCESS OF EXTRACTING, SEPARATING, AND UTILIZING THE STARCH AND PROTEIN CONTENTS OF RICE.

Application filed April 4, 1925. Serial No. 20,842.

This invention pertains to the commercial production of rice starch, and as an incident thereto, the recovery and utilization of the other components of the rice grains, with or without admixture of other ingredients, as food for cattle.

The invention consists in a novel method or process of extraction of the starch content of rice grains or kernels, free of all other matters or in a pure state, and unimpaired by the treatment through which its segregation is effected. The process also recovers or saves, unimpaired, all the protein content of the grains, the value of which, added to that of the starch, makes the manufacture of rice starch profitable, and enhances the value of rice as a farm product. This in turn affords an incentive for wider cultivation of rice, tending to lower its cost.

As a basis of comparison with and differentiation from prior methods, and better to point out the novel features and advantages of my process, a brief prefactory statement of certain facts and conditions regarding rice, its structure, and the peculiar difficulties encountered in extracting its starch content, will be made.

Under the title "Manufacture of starch from rice", Payen's Manual of Industrial Chemistry, at page 760, says: "Unaltered starch granules are at the ordinary temperature and pressure insoluble in water." At page 775 it is stated that: "The preparation of starch from rice is carried on principally in English manufactories. The product is much esteemed by laundresses and preferred to wheaten starch. No other raw material is so rich in starch as rice; but the cells and the starch granules contained in them are so closely cemented together that their separation cannot be effected by a simple washing and crushing, and an alkaline solution is always used" etc. At page 779 Payen gives the starch content of hard wheats as from 58.12 to 64.57; half hard French wheat, 68.65; and soft wheat, 75.31. The starch content of other grains is given as follows: rye 65.65; barley 65.43; oats 60.59; maize 67.55; rice 89.15.

Under the title "Starch" the American Cyclopædia, (Appleton's) condensed edition 1877, says at page 491, vol. 4: "Most of the cereals contain from 55 to 67 per cent of starch, rice nearly 90, potatoes 20, peas and beans 35 to 40 per cent. Starch is extracted from grain by two principal processes, the old or fermenting and the new or non-fermentation. * * * * * * * * Rice is treated by a process patented in 1840 by Orlando Jones, which is an improvement on Martin's and is also quite as applicable to other grains. It is macerated in a weak alkaline solution, a gallon of water to every two pounds of rice, and about two hundred grains of caustic soda or potash to the gallon, which dissolves the gluten but leaves the starch. After standing about twenty-four hours, the alkaline liquid is drawn off, and the rice being well washed is drained, and is then ground into flour. A fresh quantity of lye is added to it, and it is again digested for twenty-four hours with frequent stirring. It is now left for seventy hours, in which time the dissolved gluten rises and is all found in a turbid, yellowish stratum at the top." At page 255 of the same volume, under the title "Rice", it is said: "Although so rich in starch, it has not been found economical for supplying that article."

The manufacture of starch from rice in this country, so far as can be ascertained is very small, potatoes and corn (maize), the latter particularly, being the chief sources of supply, and this notwithstanding the fact above noted that rice has a starch content about four and a half times that of potatoes, and somewhat more than twenty per cent above that of maize, and despite the further fact that rice starch is highly esteemed for laundry use and is preferred to wheaten starch.

The reasons for the practically negligible present use of rice for the production of starch in this country are: its insolubility in and non-absorption of water at ordinary temperature and pressure; the difficulty of extracting the whole of the starch content; the time required; the large plant necessary, owing to the long periods required for maceration, digesting, settling, and separating the different components of the grain; the loss, greater or less, of the protein content; the injury to such of the protein content as is recovered by existing methods; and the fact that prior processes have been intermittent instead of continuous.

In its preferred embodiment my process is continuous. Its leading feature of novelty, wholly new in the manufacture of starch from rice so far as I am advised, consists in dry crushing, grinding or milling the hulled and cleaned grains or kernels as the first step in the process. This reduction of the grain in a dry state is carried far enough completely to rupture or break down the walls of all or practically all the starch-containing cells and the starch granules therein, so that from that point onward the individual starch granules or particles may come directly into contact with and be completely enveloped by the liquids employed in treating the crushed or dry-milled grain. These liquids are, a slightly alkaline solution and clear water. The alkaline solution attacks or acts upon, swells, and finally dissolves the gluten particles or the albuminoids of the grain, which with the fibrous matters present, tend to aggregate and form somewhat larger bodies. These rise, thus effecting the separation from the heavier starch granules, which remain suspended in the liquid while the latter is under agitation. In this way there is produced a rich starch milk from which the starch is later precipitated. The two bodies being thus separated are removed, each in condition for independent further treatment.

My process permits utilization of all broken rice, of which the aggregate quantity incident to breakage in hulling and commercial handling, is quite considerable. Such broken rice has heretofore been of almost negligible value, and its saving tends further to increase the value of starch as an article of farm produce.

The process may be carried out through the use of variable apparatus, most of the elements of which, separately considered, are old. I shall, however, describe a plant designed for the continuous carrying on of the process with consequent economy in operation. This is illustrated in the accompanying drawings, in which:

Figure 1 is an elevation of so much of the apparatus as is directly involved in the separation of the starch and the protein content;

Fig. 2, an elevation of the neutralization tank in which are treated all parts of the rice grain other than the starch; the filter press for the protein, and intermediate connections.

Fig. 3, an elevation of a rotary drier for the protein product;
Fig. 4 a longitudinal sectional view of a drier for the starch;

Fig. 5, a top plan view of the separation centrifuges.

In these drawings, 1 indicates a roller grinding mill, here shown as a four-roll stand with the rollers superposed one upon another in vertical series, and affording three passes of the grain between them. It is provided at the top with a hopper 2 to which the grain is supplied by an elevator 3, and the ground or pulverized grain is delivered through a chute or spout 4 to the trunk of a second elevator 5 by which it is delivered to a storage bin 6. From the bin 6 the finely ground rice or rice flour is delivered under control of a suitable valve or gate, to a maceration tank 7. The arrangement thus far described is merely suggestive, as of course any suitable grinding mill, one or more, may be used, and the manner of delivering the grain to the dry mill 1 and thence to the storage bin 6 may be varied according to the particular conditions existing at the place of installation.

The maceration tank 7 is made of dimensions to contain and treat within a given period of time, a predetermined quantity of the ground rice or rice flour, and is supplied with water by an inlet pipe 8 and with an alkaline solution by a pipe 9, each controlled by a suitable valve. In practice, the alkaline solution in the maceration tank should be of a strength of approximately from one-quarter to one-third of one per cent caustic soda or caustic potash, and the desired strength may readily be assured by introducing first a measured quantity of water or permitting it to rise to a previously calculated level, and thereafter introducing a measured quantity of the alkaline solution of known strength, or permitting the solution to flow into the water until the mingled water and alkaline solution attain a predetermined level. To protect the maceration tank, and other tanks in which the alkaline solution may be employed, against attack by the solution, and to prevent any discoloration of or other injurious effects upon the material under treatment in such tanks, they may be formed of wood or metal lined with tin, copper, stone, or earthenware, or they may be formed mainly or wholly of stone or earthenware.

Within the maceration tank 7 there is mounted a rotary stirrer 10 of any suitable form, carried by a vertical shaft 11 having at its upper end a swivel connection 12 with a chain 13 passing over a pulley 14 and provided with a counterbalance weight 15, which latter serves to hold the stirrer and its shaft at any desired elevation to which it may be adjusted. The shaft 11 is formed with a spline or feather, and passes centrally through a beveled gear-wheel 16 supported by and turning in a suitable bearing carried by a cross-beam 17 at the top of the tank, said gear-wheel being driven by a pinion 18 carried by a shaft 19 provided with a belt-pulley 20 or other means through which to receive rotary motion from any convenient prime mover. This arrangement of the stirrer permits it to be lifted from or dropped into the alkaline solution, where it will serve to stir or agitate the solution and the contained rice flour, thus insuring speedy and effective action of the solution upon the several components of the rice grains throughout the mass.

Obviously, the stirrer alone may be made vertically adjustable upon and relatively to the shaft 19 by attaching the swivel directly to its hub, rotatable with the shaft.

For the purposes of this description it may be assumed that one ton of the finely ground rice or rice flour will be treated in the maceration tank at one time, and that the other tanks, the wet mill, sieves, centrifuges, etc., will be of capacity to handle the output of the maceration tank, allowing to each its due time of operation. For treatment of one ton of rice flour, there should be supplied to the maceration tank one thousand gallons of water, with twenty-one and one-half pounds of caustic alkali added to and dissolved therein. The stirrer 10 is then lowered into said tank, well below the surface of the liquid, and caused to rotate, so as to put in motion the alkaline solution. Next, one ton of rice flour is drawn from the storage bin and delivered somewhat gradually into the liquid, so that an undue load may not be suddenly placed upon the stirrer and cause stoppage thereof. Rotation of the stirrer will advisably be continued throughout the period of maceration, which in practice should be about twelve hours, more or less, or about one-half the time required for maceration of the whole rice grains under former processes.

When the maceration has been carried to the proper stage the stirrer 10 is raised, and the solution allowed to come to and remain at rest for a time sufficient to permit the settling or precipitation of the starch content to the bottom of the tank, while the other constitutents of the grain, being of lesser density than the solution, rise to and form a stratum or layer at the surface or in the upper portion of the solution. When this stratification is effected the upper or receiving end of a siphon 21 is lowered into the tank 7 to a point slightly above the surface of the starch stratum or layer, and the supernatant liquid containing the proteins and cellular constituents of the grain is siphoned off and delivered to a neutralization tank 22, into or over which the discharge end of the siphon extends. By thus siphoning off the solution and matters dissolved or suspended therein, separation is effected between the bulk of the protein content and the bulk of the starch content, though there will be at this stage some starch mingled with the upper or protein stratum, and some of the protein content mingled with the starch in the lower stratum.

After removal of the supernatant liquid, clear water is introduced into the maceration tank to about the same level as that of the previously contained alkaline solution. The stirrer 10 is again lowered into the water and set in motion, for the purpose of agitating the starch mass and washing out therefrom such of the protein and other constituents, fibrous material and the like, as may still be associated with the starch in said tank. This washing requires a relatively short time under the vigorous agitation of the stirrer. The washing accomplished, the stirrer is again raised out of the liquid, the solution is permitted to come to rest, the starch is again precipitated, and any of the protein content released through such washing will, as before, rise to the surface. The wash liquor is then siphoned off and delivered to the neutralization tank 22, where it mingles with the alkaline solution previously siphoned off.

Tank capacity sufficient to accommodate all the alkaline solution and wash water used in a day's run of the plant should be provided, and this may be a single tank, or several communicating tanks or tank sections may be employed and interconnected, where space can be better utilized by so doing. Both the alkaline solution and the wash water used throughout the process down to the final separation of the starch will be found to contain, usually, more or less starch along with the proteins, and the purpose of collecting it in the neutralization tank is to render it fit for feed by neutralizing the alkali contained in the mingled charges of alkaline solution and wash water. The manner of preparing this protein feed will be later explained.

After siphoning off the wash water as above explained, the starch precipitate in the maceration tank is delivered by a valved connecting pipe 23, or in other convenient way, to a wet mill 24, which may conveniently be of the buhr stone type, and which may advantageously be supplied during the grinding, with a small quantity of alkaline solution of the same strength as that used in the maceration tank. The alkaline solution serves to soften any protein content which may be present in the material under treatment, and to keep clean the active faces of the buhr stones. The function of the wet mill is to break down any unreduced portions of the grain structure, as the starch cells, starch granules, and proteins, and to rub or work out and expose all such matters.

From the wet mill 24 the product passes to an inclined sieve 25, to remove all fibrous or solid matter. This sieve is here shown as cylindrical and provided with a central tubular shaft or axle 26, having numerous fine perforations and connected with a water tank or main, so that water may be thrown in a fine spray upon the macerated mass delivered into the elevated end of the sieve 25 and spread over a considerable portion of its surface through rotation of the cylinder. Such rotation is effected in any usual way, bevel gears 27, 28, being here shown, one gear carried by a shaft having a belt pulley through which it may receive rotary motion by belt from a suitable prime mover. The cylinder is clothed preferably with silk bolting cloth, or with fine copper wire cloth, and the product of the wet mill in passing through the cylinder is separated into two bodies, the starch milk or fine starch particles suspended in the liquid passing therewith through the meshes of the sieve and falling into a collection tank 29 beneath, and the larger or swollen protein and fibrous matters tailing off at the lower end of the sieve, whence they are carried to the neutralization tank 22 by a pipe 30.

Even the fineness of the sieve mesh does not ensure complete removal of the protein substance, though it does remove all fibrous matters and any protein particles of appreciable size. The starch milk with this small remaining protein content is hence treated in one or more separating centrifuges, wherein the separation is effected according to the specific gravity of the several substances brought from the collection tank 29. Any suitable type of centrifugal separator may be used, but I have illustrated here a special form set forth in U. S. Patent No. 757,778 granted and issued to Richard Schrader, April 19, 1904, and designed for use in handling crude starch liquor.

This type of centrifuge is illustrated in Figs. 1 and 5, where a battery of three machines, 31, 32 and 33 is shown. These machines differ from those more commonly employed in the arts in that, as shown, the liquid-containing chamber does not rotate; that its walls taper or incline inwardly from its base upward, producing a conical or frusto-conical chamber; that rapid whirling motion is imparted to the liquid or fluid mass by a stirrer or agitator 34 rotating in a horizontal plane in the lower portion of the chamber, and driven at such speed as to impart to the fluid mass a strong centrifugal tendency, and that the upper end of each centrifuge is closed except for inlet and outlet pipes. This causes the fluid mass to rise in the chamber in the form of a thin sheet or layer lying against the inner surface or wall thereof, the different constituents of the mass rising to different levels according to their relative specific gravity. The last centrifuge 33 of the three in which the starch milk is successively cleansed is furnished with a valved pipe 76 which may be opened from time to time, thus permitting a portion of the alkali-saturated wash water to escape and thereby reducing the amount of hydrochloric acid required in the neutralization tank, to which the remainder of the wash water with the protein contents are ultimately returned. Otherwise the entire volume of wash water will be returned, as elsewhere stated. As indicated, each stirrer 34 is carried by a tubular vertical shaft 35 provided with a beveled gear 36 supported upon a suitable bearing at the top of the chamber and in turn supporting the shaft and stirrer, said gear 36 meshing with a like gear 37 driven in any suitable way and at appropriate speed. A solid shaft may be used in lieu of the tubular shaft 35, but the latter is preferred because it affords a convenient conduit through which to introduce the starch milk flowing from the collection tank 29, and to deliver the same at the center of the centrifuge.

The centrifuge 31 is provided near its center with a valved outlet pipe 38 for the escape of any sediment, such as sand or dirt, which may enter the centrifuge, and at its base with a circumferential outlet having a valved discharge pipe 39, through which the starch may escape. Near the top of the conical chamber of centrifuge 31 is provided an outlet pipe 40 for the escape of the water content of the starch milk entering through the tubular shaft 35. Pipe 39 passes to and enters the top of the chamber of centrifuge 32, delivering the partially purified output of centrifuge 31 to the interior of centrifuge 32 at a point near its center. Similarly, the chamber of centrifuge 32 is provided at its base with a circumferential outlet having a valved discharge pipe 41 which extends to and enters the top of the chamber of centrifuge 33 near its center, so as to deliver the output of centrifuge 32 to the centrifuge 33. Centrifuge 32 has near its top an opening communicating by a pipe 42 with the top of the chamber of centrifuge 31, through which pipe the water from centrifuge 32 is passed or delivered to centrifuge 31, and in like manner centrifuge 33 is provided near its top with an opening communicating by a pipe 43 with the top of the chamber of centrifuge 32. Finally, centrifuge 33 has at its base a valved circumferential outlet pipe 44, from which the starch successively treated and purified in the centrifuges 31, 32 and 33 is delivered from the last of the series. To replace the water delivered from the several centrifuges, a water-supply pipe 45 communicating with any convenient source of supply, enters the top of the chamber of centrifuge 33.

From what has been stated above it will be evident that the starch milk enters first the centrifuge 31 and is given a preliminary separation and purification therein, passing thence into centrifuge 32 which gives a second separation and purification, and is then delivered into centrifuge 33 where it receives a final separation for removal of as much water as possible and of protein and matters other than pure starch. It will also be seen that the water entering by pipe 45 in quantity sufficient to give to the contents of the centrifuges a density of 5 to 10 degrees Baumè, passes in a reverse direction to the starch milk treated, or backward from centrifuge 33 to centrifuge 32 by pipe 43, and from centrifuge 32 to centrifuge 31 by pipe 42, and thence to the neutralization tank 22, by pipe 40, where it is added to the alkaline and wash waters already delivered thereto.

The heavy, clean starch milk as delivered from the last centrifuge 33 has a density of 20 to 30 degrees Baumè, and it is desirable to remove as large a percentage of the water content as practicable preparatory to final drying of the green starch in a kiln or drying chamber. To effect this removal of moisture, the cleansed starch milk is charged into a drying centrifuge 46, which has a wire gauze basket, and may have a filtering body covering its inner face. The superfluous water is driven out by rapid rotation and consequent centrifugal action, leaving the starch in solid form within the basket. This green starch has a moisture content of 30 to 40 per cent, and as commercial starch has a moisture content of about 18 to 20 per cent, it is necessary to remove the excess moisture.

This is accomplished by passing the green starch through a drier in which it is subjected to the conjoint action of heat and a moving current of air. To dry the starch efficiently, expeditiously, and without injury, it is found desirable to cause it to travel a considerable distance in the kiln or drying chamber, and to approach gradually the heating element or elements located at the discharge end of the chamber through which the starch is conveyed. It is also found expedient to have the air current traverse the drying chamber in a direction opposite to that in which the starch moves. The purpose and effect of this arrangement is to subject the incoming starch first to a moderate heat and to a progressively increasing temperature as it nears the point of discharge, so that it shall be subjected but a short time to the highest temperature deemed safe or expedient in its treatment, and this just prior to its discharge from the drier.

The drier is accordingly constructed as shown in Fig. 4, and comprises a chamber 47 at one end containing radiators or other heating units 48, said chamber having an air inlet 49 and a fan 50 for drawing the air thereinto and forcing it past the heating units; and an elongated tunnel-like chamber 51 communicating with chamber 47 and having at the end remote from said chamber a stack or chimney 52 containing a fan 53 which supplements the action of fan 50, and tends to aid the inflow of air into the chamber 47 and through the kiln, the air finally passing upward and outward through the stack 52. The green starch enters chamber 51 through a suitable hopper or inlet 54, and falls upon an endless apron, belt or conveyor 55, the upper stretch of which moves toward the heating chamber. This belt passes about rolls 56 at opposite ends of the chamber 51, and is suitably supported between said rolls to prevent sagging. Either or both of the rolls may be rotated in any convenient way to cause the proper travel of the belt or conveyor. The delivery end of conveyor 55 overhangs a trough 57 extending transversely across the chamber 51, and provided in its bottom with a spiral conveyor 58 which serves to deliver outside of the hopper the dried starch delivered by the conveyor 55.

The importance of subjecting the green starch to a progressively higher temperature, or causing it gradually to approach the point of greatest heat in the drying chamber, and of having it travel in opposition to an incoming current of cool air, lies in the fact that pasting of the green starch is thereby prevented, and a very white product results. Such pasting of the green starch during the drying process has heretofore presented much difficulty but is overcome by the plan just described, and a starch of exceptionally high quality and appearance results.

To utilize fully the protein contents of the rice, the entire body of alkaline solution and all the wash waters are, as before stated, delivered to a neutralization tank 22, in which they are treated with hydrochloric (muriatic) acid in quantity sufficient to effect complete neutralization of the alkaline content of the tank. This tank is preferably constructed and equipped as shown in Fig. 2; that is to say, it is provided with one or more rotary stirrers 59 similar to the stirrer employed in the maceration tank, and capable of being driven, raised and lowered in the same way. Said tank is likewise provided with a siphon 60, the discharge end of which may connect with a sewer or waste pipe, while the inlet end is suspended by a rope 61 passing over a pulley 62, and serving to raise or lower the intake end of the siphon.

After effecting a thorough mixing and mingling of the contents of the neutralization tank by putting into rotation the stirrer 59 (one or more), and maintaining such action for a suitable length of time, hydrochloric acid is gradually added to the liquid in the tank so that it will be taken up and distributed throughout the mass, and act upon and neutralize the alkali. When such neutralization is shown by the usual tests to be complete, and after allowing the contents of the tank to remain at rest a time sufficient to permit the protein and fibrous matters in the liquid to rise to the top, the intake end of the siphon 60 is dropped into the liquid and well toward the bottom of the chamber, and the underlying liquid is drawn off until the protein and other contained matters begin to show at the outlet, whereupon the siphon is raised above the tank and the discharge of liquid is stopped. The tank should be formed of or lined with a material which will not be injuriously acted upon by the acid used in said tank to neutralize its contents.

The semi-liquid mass remaining in the tank 22, and comprising all the protein matter, is then drawn from said tank by a pump 63 of any suitable construction, and delivered into a filter-press 64 of any usual type, wherein it is compressed to express the remaining liquid and to produce filter-press cake. The material in this form may be fed to cattle, preferably mixed with other feed such as cotton seed meal or the like, the protein content being too great to make the use of the cake alone advisable.

If the green cake is to be fed promptly after its formation in the filter-press, no further drying is required; if, however, it is not to be fed very soon after pressing, it should be dried to enable it to be kept without fermentation or injurious change. Such drying may be effected in the tunnel drier before described, but if quicker drying be desired, the drier illustrated in Fig. 3 may be used to advantage. This consists of a jacketed cylinder 65 provided on its circumference with hoops or bands 66 running upon flanged rolls 67 arranged in pairs on opposite sides of the vertical plane of the axis of the cylinder, and near the ends thereof. Rotation is imparted to the cylinder by means of a screw or worm 68 journaled in a suitable support and driven from any prime motor, said worm meshing with an annular worm-wheel or band 69 encompassing the cylinder and secured thereto. Steam or other heating medium is delivered to the interior of the double-walled or jacketed cylinder through a pipe 70 connected by a universal coupling 71 to a central pipe 72 communicating with the interior of the double wall by radial branches 73. Within the cylinder there is arranged a continuous spiral band which tends to move the material fed into the elevated end of the cylinder, gradually toward the discharge end where it falls into a trough 74 provided with a screw conveyor 75, by which it is delivered to any suitable receptacle.

In order that the process may be uninterrupted throughout, it is desirable that the centrifuge 46 be of the continuously-acting type, of which there are different designs on the market. In such centrifugal driers the material to be treated is introduced through a hopper at the top of the machine, and passes through an annular space between two conical members, the inner one of which rotates at high speed, while the outer may rotate at a lower speed or be held at rest. Scrapers traversing the annular space between the inner and outer members, serve to effect a constant travel of the mass under treatment, and to prevent clogging of the screen. An outer casing arrests the liquid forced through the screen or filtering body, and delivers it to a launder, whence it flows to the neutralization tank and mingles with the other wash waters and solutions.

While the several structures here described are suitable to the purposes set out, and are deemed by me those most appropriate to such uses, it is to be understood that they are illustrative merely, and may be replaced by any equivalent mechanisms suited to the several duties indicated.

It is also to be understood that a flat shaking or reciprocating sieve or screen may be substituted for the rotary screen 25; that more than one dry grinding mill and more than one wet mill may be employed; and that the separation centrifuges and the final drying centrifuge may be increased in number if desired, the aggregate capacity of each unit or element of the apparatus being such as to enable the plant to operate continuously, and to deliver from each element to the next the quantity of material suitable to its purposes, so that each part of the apparatus shall be of a capacity to handle in a working day the total amount of rice flour drawn from the storage bin 6.

It is obvious that instead of siphoning the liquid from the maceration and neutralization tanks, it may be drawn off through pipes or outlets at different levels, or through a flexible pipe, the discharge end of which may be raised or lowered according to the quantity and condition of the liquid to be withdrawn.

As pointed out, the time required for maceration of the previously dry-milled rice is about one-half the time required where the preliminary dry-milling is omitted, and an alkaline solution of less strength than heretofore deemed necessary is employed, which in turn reduces the quantity of acid required for subsequent neutralization of the liquids incident to the process, and also minimizes the injurious action of the acids upon the apparatus. The subsequent steps of wet-milling, sieving and centrifuging, both for separation and for drying, are continuous and relatively brief, and the final drying of the green starch under the conditions here set forth is expeditious as compared with other modes of drying. The aggregate time required for the complete carrying out of my process is hence greatly reduced as compared with all prior methods or processes known to me, or so far as I can find in works upon the subject. The result is a starch of exceptionally high grade which may be used for laundry work and in the preparation of textiles, for various culinary purposes, and in the making of confectionery, and which is peculiarly suited for use as the base of various toilet preparations, face powders, and the like.

What is claimed is:—

1. In a process of manufacturing starch from rice wherein the different contents of the grain are subjected to chemical action, and as the initial step in said process, dry grinding or crushing the rice grains to an extent sufficient to break down the starch cells and the starch granules thereof, so that the starch particles and the glutinous matters of the grain may be quickly enveloped, permeated, and saturated by a liquid.

2. A process of manufacturing starch from rice comprising, first, dry grinding or crushing the grain sufficiently to break down the starch cells and the starch granules thereof; and second, subjecting the product so treated to the action of a solution capable of dissolving the glutinous matters of said product, the glutinous content being thereby dissolved and caused to rise with the fibrous matters of the grain, while the starch is precipitated to the bottom of the solution, thus effecting separation.

3. In the process of manufacturing starch from rice, first, dry grinding or crushing the rice grains sufficiently to break down the cellular structure and to release and rupture the starch granules; second, subjecting the dry-milled product to the action of a weak alkaline solution and to agitation in such solution; third, arresting the agitation and thereby permitting the starch to precipitate and the protein content to rise to the top of the solution; fourth, removing the solution and its protein content and washing the precipitated starch; fifth, passing the starch milk at a density of 5 to 10 degrees Baumé, successively through centrifugal separators, to remove a portion of the water content and any remaining proteins; sixth, subjecting the heavy cleansed starch milk to the action of a drying centrifuge to remove moisture therefrom; and finally reducing the moisture content of the green starch to the customary commercial percentage, by drying the same through the action of heat and a moving air current.

4. The process of extracting starch from rice, which consists in the following steps performed in the order stated, to wit: dry grinding or crushing the hulled rice to break down the cellular structure of the grains to liberate the starch granules and to reduce said granules to a fine powder; subjecting the dry-milled product to the action of a weak alkaline solution and simultaneously agitating the mass; permitting the solution to settle, thereby causing the starch to gravitate to the bottom and the protein content to rise to the top; removing the solution and its protein content from above the precipitated starch, adding water to the starch precipitate, again agitating the mass, and thereafter permitting it to settle; passing the macerated mass into a stone mill and milling the same in the presence of a small quantity of a weak alkaline solution; passing the product from the wet mill to a fine sieve or sieves, and subjecting it simultaneously to a sifting action and to washing with water to remove all fibrous or solid matter, and delivering the starch and protein into a collection tank while the materials held back by the sieve are added to the contents of a neutralization tank; next passing the liquid mass from the collection tank through one or more separation centrifuges at a density of 5 to 10 Baumé; passing the starch milk from the final separation centrifuge, at a density of 20 to 30 degrees Baumé, into a drying centrifuge to remove a considerable portion of the water content and any remaining proteins; and finally, drying the green starch by causing it to travel through a heated chamber or passage toward the source of heat and in opposition to the travel of a current of heated air.

5. The process of extracting from rice and utilizing, its starch and its protein contents, which process consists in dry-milling or reducing the hulled starch grains to break down the cellular structure, release the starch granules and proteins, and break down said starch granules; macerating the dry-milled product in a weak alkaline solution subject to agitation; permitting the solution to come to rest and the starch and protein contents to separate through precipitation of the starch and flotation of the protein contents; removing the alkaline solution with its protein content from above the precipitated starch; washing the precipitated starch to remove the alkali therefrom; wet milling the washed starch; sieving the wet-milled product subject to a water spray, to remove fibrous matters and protein; adding to the sieved starch milk, water sufficient to bring it to a density of 5 to 10 degrees Baumé; centrifuging it to remove the remaining alkali and protein content; extracting by means of a drying centrifuge, so much as practicable of the remaining water content; and drying the green starch by heat and air currents.

6. The herein-described process of making rice starch, which consists in first dry grinding the rice kernels to break down the starch cells, and the starch granules contained therein; macerating the dry milled product in a weak alkaline solution subject to agitation; permitting the solution to come to rest and the starch and protein contents to separate through precipitation of the starch and flotation of the protein contents; removing the alkaline solution with its protein content from above the precipitated starch; washing the starch to remove the alkali therefrom; wet milling the washed starch; sieving the wet-milled product subject to a water spray, to remove fibrous matters and protein; adding to the sieved starch-milk, water sufficient to bring it to a density of 5 to 10 degrees Baumé; centrifuging the starch milk to remove the remaining alkali and protein content; extracting by means of a drying centrifuge, so much as practicable of the remaining water content; and drying the green starch by heat and air currents, the waste solution and wash waters and the protein and fibrous matters contained therein being delivered to a common receptacle.

In testimony whereof I have signed my name to this specification.

OTTO JASCHKE.